INVENTOR.
JOHN G. RUSSELL
BY
Oberlin & Limbach
ATTORNEYS.

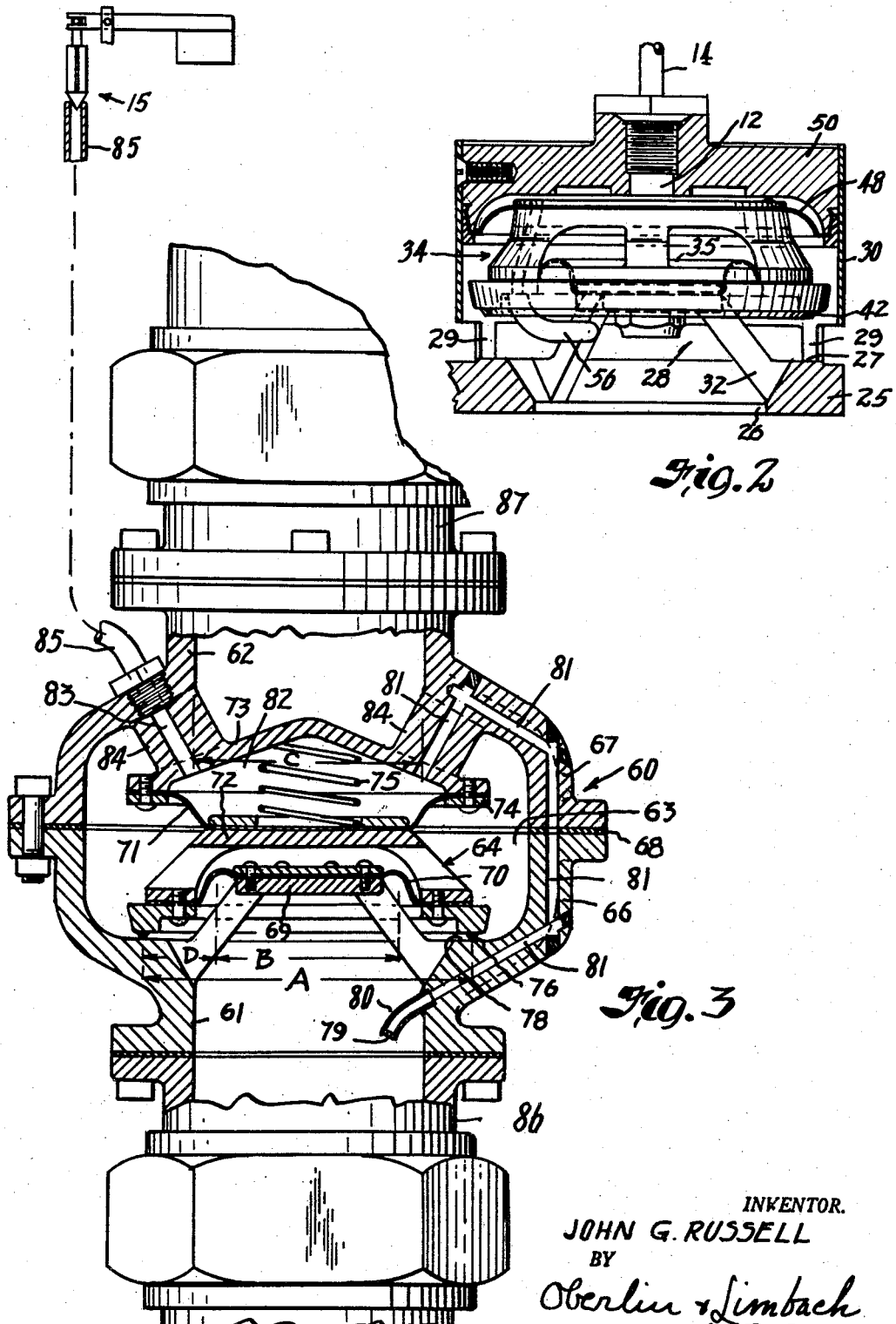

United States Patent Office 2,913,217
Patented Nov. 17, 1959

2,913,217

FLUID PRESSURE ACTUATED AUTOMATIC SHUT-OFF VALVE

John G. Russell, Mayfield Heights, Ohio, assignor to Parker-Hannifin Corporation, a corporation of Ohio Application January 14, 1955, Serial No. 481,852

9 Claims. (Cl. 251—46)

The present invention relates generally to a fluid pressure actuated automatic shut-off valve which is adapted, for example, to be installed in the bottom of, beneath, or in the refueling line leading to the bottom of an aircraft fuel tank, for controlling fuel flow thereinto. When so installed, the valve herein must be capable of opening automatically in response to predetermined pressure of fuel in the refueling line so as to permit flow of fuel into the tank, and of closing automatically responsive to actuation of a fuel-level-sensing device such as a float valve, a solenoid valve, or the like, so as to arrest further fuel flow into the tank when the tank has been filled to desired level.

In general, shut-off valves of the character indicated have been used heretofore in aircraft fuel systems and elsewhere, but so far as I am aware, these valves have each included therein a spring-seated valve member (usually of the diaphragm type) of which one side is exposed to fuel pressure in the refueling line and has a seat of prescribed diameter to afford, when said valve member is unseated, a passage of free flow characteristics to enable rapid filling of the tank with minimum pressure drop; and of which the opposite side is of larger diameter than said one side and is exposed to fluid pressure in a seating chamber. Said chamber is in fluid communication with the inlet or refueling port through a control orifice which, when the sensing device is actuated, permits equalization of fluid pressure in the inlet and seating chamber with consequent urging of the valve member to closed position under the influence of the greater effective force of the spring and of the fluid pressure acting on such larger area of the valve member. On the other hand, when the fluid under pressure acting on the larger area aforesaid of the valve member is released faster than it can be built up through the aforesaid orifice, the valve member will be unseated by predominance of the force of the then greater fluid pressure acting on such smaller area.

Heretofore, such area differential of opposite sides of the movable valve member has been achieved by making the diameter of the seating chamber side of the valve member larger than the diameter of the valve seat on the inlet; and, as a result, the valve casing is correspondingly larger in diameter, heavier, and bulkier.

Another point about the prior art automatic shut-off valve of the character indicated which warrants comment is that the control orifice aforesaid has been formed by numerous angularly related drilled holes in mating valve casing parts which must register with each other and additionally must be sealed and plugged.

With the foregoing in mind, it is one general object of this invention to provide a valve of the character indicated which embodies the feature of overbalanced fluid pressure seating or closing of the valve member, but without necessity of having the diameter of the seating chamber area of the valve member any greater than the diameter of the area of the valve member which is exposed to the fluid under pressure in the inlet port.

Another object of this invention is to provide a novel valve design in which desired area differential on opposite sides of the movable valve member is achieved by the expedient of immobilizing the central portion of one side of the valve member to leave only an annular area which is exposed to the fluid under pressure in the inlet port and of providing a circular area on the opposite, seating chamber side of the valve member of substantially the same (or smaller) diameter as the outside diameter of such annular area which is exposed to the overbalancing or seating force under conditions of substantially equal fluid pressures acting on the opposite sides of the valve member.

Another object of this invention is to provide a valve of the character indicated in which the valve member aforesaid, when moved to open position, provides for free flow of fluid through the valve with a minimum pressure drop.

It is another object of this invention to provide a valve of the character indicated which has therein a novel form of movable valve member.

Another object of this invention is to provide a valve of the character indicated in which the control orifice aforesaid is formed in the movable valve member to constitute what may be termed a "floating pickup" to simplify the structure while yet locating the orifice in a desired portion of the fluid stream.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is a cross-section view showing the tank-mounted valve of Fig. 1 in its open position permitting flow of fuel therethrough into the tank; and Fig. 3 is a central vertical cross-section view of a line-mounted type valve provided with inlet and outlet ports at its opposite ends for connection in a fuel line extending from the refueling pump to the fuel tank.

Figure 1:
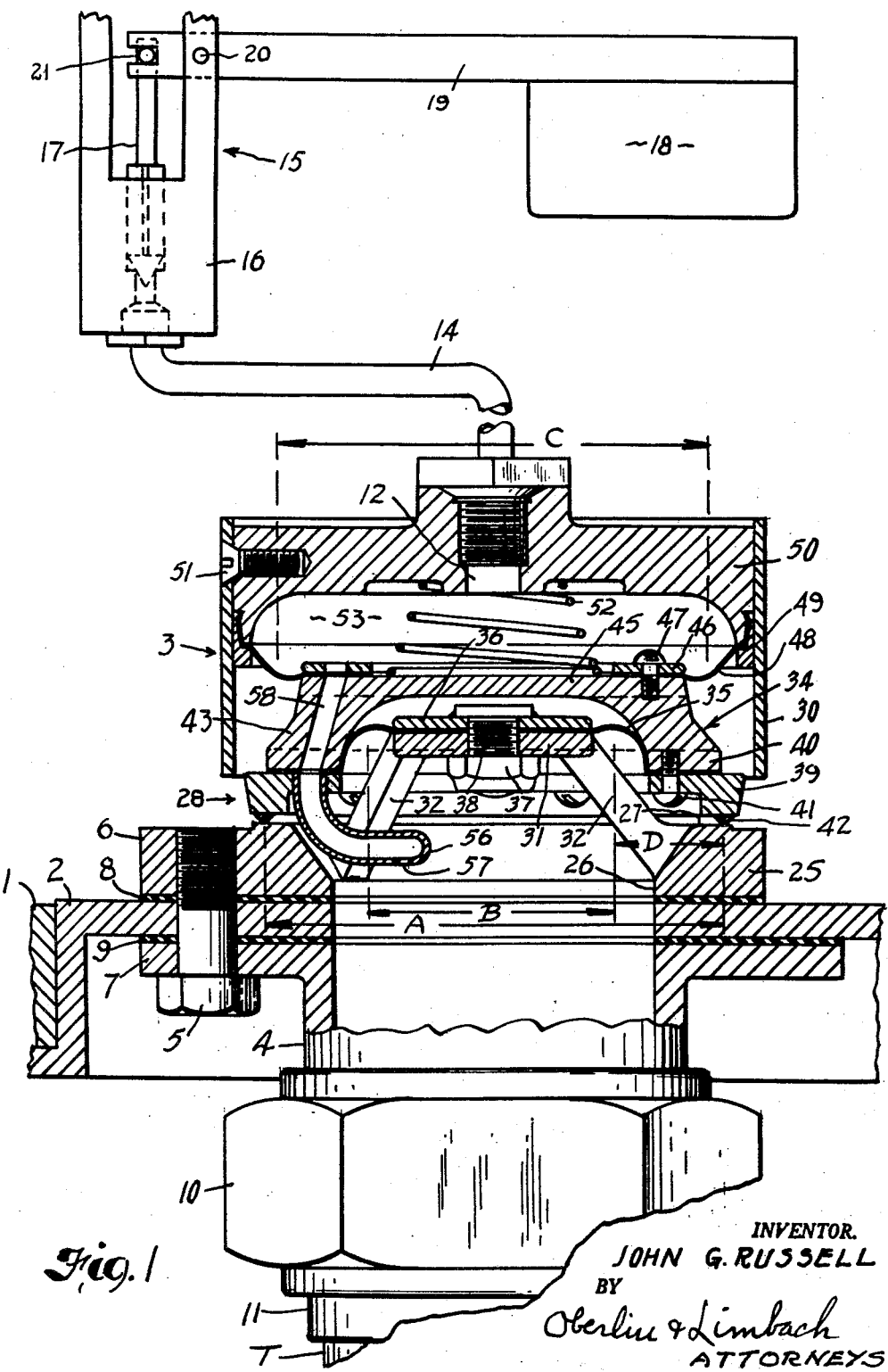
Fig. 1 is a central vertical cross-section view of a tank-mounted valve which is secured inside a fuel tank at the bottom thereof, and which valve is actuated by a fuel-level-sensing device, here illustratively and schematically shown as a float-operated pilot valve disposed at or near the top of the fuel tank.

Referring now more particularly to the drawings, and first to Fig. 1, the reference numeral 1 designates a portion of the bottom wall of a fuel tank having a fitting 2 to which the present valve 3 and a tube fitting adaptor 4 are mounted within and without the tank, respectively, as by means of bolts 5 threaded in lugs 6 of said valve and extending through holes in the flange 7 of said adaptor. Suitable gaskets 8 and 9 serve to seal the valve-fitting and adaptor-fitting joints. Said adaptor 4 has a tube T connected thereto in any known manner such as the nut 10 and sleeve 11 which serve to clamp the flared end of said tube against a frusto-conical seat of said adaptor 4. Said tube T is the refueling line through which fuel is adapted to flow into the bottom of the fuel tank by way of the valve 3.

The upper end of said valve 3 is formed with a port 12 to which a tube 14 is connected leading to fuel-level-sensing device, herein exemplarily shown as a float-controlled pilot valve 15 which comprises a valve body 16 hung from or otherwise supported near the top of the fuel tank and having a valve member 17 therein movable between open and closed positions according to the position of the float 18. Said float 18 is mounted at the end of a lever 19 which is pivotally connected to valve body 16 at 20 and has its other end bifurcated to engage the transverse pin 21 of valve member 17.

As evident, when the tank is full, the float 18 will, through lever 19, hold the valve member 17 down in its seated position in body 16 and this, as will be seen later, will close the main fuel inlet valve 3. Of course, when the fuel in the tank has been partly used up, the float 18 will swing downwardly to raise the valve member 17 to its unseated position in body 16 so that the valve 3 may be opened by connecting a fuel pressure line to tube T when it is desired to fill the tank.

The operation of the float-controlled pilot valve 15 will be described in greater detail hereinafter. However, it is to be understood that, for the purposes of the present invention, the float-controlled pilot valve 15 is merely one example of a fuel-level-sensing device, and for achieving the desired function of valve 3, the valve member 17 or its equivalent may be moved between open and closed positions manually, electrically, or otherwise, instead of by means of the float 18.

Referring now in detail to the tank-mounted type of fuel inlet valve 3 as shown in Fig. 1, the same comprises a base part 25 having several mounting lugs 6 by means of which, as already described, the valve 3 as a whole is adapted to be secured in fluid-tight manner to the tank fitting 2, said base part being formed with an inlet port 26 terminating in an annular valve seat 27 past which fluid is adapted to flow in a generally radial direction into the tank through an annular outlet 28 which is interrupted only by the relatively narrow supporting legs 29 (see Fig. 2) of the upper casing part 30, whereby fluid may freely flow through the inlet 26 and outwardly through the annular outlet 28 into the tank with minimum pressure drop.

The base part 25 is integrally formed with a central boss 31 supported by spider legs 32 in a position coaxially beyond the seat 27.

The movable valve member 34 which controls the flow of fluid as aforesaid comprises a double diaphragm assembly, the bottom diaphragm 35 of which has its central portion clamped between said boss 31 and a plate or disc 36 as by means of nut 37 and screw 38. In this way, the central portion of the diaphragm 35 is rendered inactive or immobile. The peripheral portion of said bottom diaphragm 35 at a region thereof radially spaced from said boss 31 is clamped between two rings 39 and 40 by screws 41 or other equivalent means, one ring 39 carrying a rubber-like valve seat 42 adapted to engage and disengage the aforesaid seat 27 in the base part 25 to respectively close and to open said valve 3.

The other ring 40 is formed with several upwardly extending spider legs 43 which are integrally joined with an uninterrupted disc-like portion 45 which is disposed above the boss 31 and which has clamped thereto, as by ring 46 and screws 47, the inner peripheral portion of the upper diaphragm 48. The outer peripheral portion of diaphragm 48, at a region thereof which is radially spaced from the clamped inner portion, is secured between complementary wedge-surfaced parts 49 and 50 which preferably have slightly different tapers, as shown, to provide a gradually releasing grip upon said diaphragm. The upper edge portion of part 49 may be crimped or spun radially inward into the undercut formed in the part 50 and thus these parts 49 and 50 are locked together with the diaphragm 48 clamped therebetween. The top part 50 is secured by screws 51 to the tubular casing part 30 and is formed with the port 12 previously described.

Compressed between the disc part 45 of the valve member 34 and casing part 50 is a compression spring 52 which is effective to maintain the valve member 34 in a closed or seated position except when the pressure of fluid acting upwardly on the annular area of diameter A less diameter B (that is, the immobilized or inactive portion of the bottom diaphragm 35) exceeds the pressure of fluid in the seating chamber 53 acting on the area C of the top diaphragm 48 and the force exerted by spring 52.

As can be seen in the drawing, the effective diameter C of the top diaphragm 48 is approximately the same as the seat diameter A; and, therefore, the diameters of the casing parts 25, 30, and 50 are relatively small, even though the valve seat opening of diameter A is large.

Now, insofar as the operation of the valve 3 is concerned, let us assume that the tank is only partly filled with fuel or is empty and that it is desired to fill the same. In this condition of the tank, the float 18 will have swung down, the valve member 17 being in its raised, unseated position in body 16, thus opening fluid communication between the top of the tank, above the level of the fuel therein and the seating chamber 53 of valve 3 by way of tube 14. Now, when fuel under pressure is admitted into tube T, it acts upon the annular area of radial width D, that is, the annular area of diameter A minus diameter B, thus tending to move the valve member 34 upwardly.

In the Fig. 1 construction, the valve seat part 39 carries a curved tube 56 formed with an orifice 57 which is exposed to the pressure of the fuel in the inlet port 26. Said tube 56 communicates with a passage 58 through one of the spider legs 43, through parts 40, 45, and 46, and leads into the aforesaid seating chamber 53. Because the float-controlled pilot valve 15 has an outlet opening through it substantially larger than the orifice 57 in said tube 56, the chamber 53 will be vented at a more rapid rate than fuel can enter through said orifice, and, therefore, the fuel pressure in the inlet 26 will be greater than the pressure of the fuel in the chamber 53 acting on area of diameter C tending to hold the valve member 34 in seated position. When the unbalance of forces acting on opposite sides of said valve member 34 reaches a predetermined value, said valve member will be urged upwardly to disengage its seat 42 from the seat 27 as shown in Fig. 2, whereupon fuel will freely flow through the inlet 26 and radially outward through the annular passage 28 into the tank.

When the tank has been filled with fuel to the desired level the float 18 will have been swung upwardly to close the pilot valve 15; and, therefore, because fluid can no longer escape from the chamber 53, the fluid pressure on opposite sides of said valve member 34 becomes substantially equalized, whereupon the force of the spring 52 and the force of the fuel fluid under pressure in the chamber 53 acting on the area of diameter C will predominate over the upward force of the fluid under pressure which acts only on the lesser area of radial width D. Accordingly, the valve member 34 will be forced downwardly to seated position to block the incoming fluid even though the same be under pressure.

When valve member 34 is in unseated position as shown in Fig. 2, the orifice in the curved tube 56 is yet in the high pressure stream of the incoming fluid so as to maintain the pressure differential to keep said valve member in open position until the tank has been filled to the desired level.

Referring now to Fig. 3, there is shown therein a line-mounted type of valve 60 which otherwise is of substantially the same construction as the tank-mounted type of Figs. 1 and 2 except that the valve casing is formed with inlet and outlet ports 61 and 62 at its respective ends which are joined together by an annular passage 63 which surrounds the movable valve member 64. In this case, the valve casing is formed of two parts 66 and 67 which are bolted or otherwise secured together with a gasket 68 therebetween, one part 66 being formed with a spider-supported boss 69 to which the central portion of the bottom diaphragm 70 is clamped; and again, as in Fig. 1, the inner portion of the top diaphragm 71 is clamped to a disc-like part 72 and the outer peripheral portion is clamped between a spider-supported partition 73 in casing part 67 and a ring 74. A spring 75 is compressed between the partition 73 and disc-like part 72 and is effective to maintain the valve member 64 in seated position with its seat 76 engaging the seat 78 in the casing part 66.

In the Fig. 3 valve 60, the control orifice 79 is formed in a tube 80 which extends toward the center of the inlet port 61 from the casing part 66 and communicates, by way of drilled passages 81 in the respective casing parts 66 and 67, with the seating chamber 82 defined between the top diaphragm 71 and the partition 73. The port 83 leading into the chamber 82 through one of the spider legs 84 is adapted to be connected as by tube 85 to any suitable sensing device such as the float-controlled pilot valve 15.

Because the operation of the Fig. 3 construction is practically identical with that of Fig. 1, repetition is not deemed necessary, the same letters of the alphabet having been used to designate the diameters of the areas which serve to control the movements of the valve member 64 under various conditions of operation during and after filling of the tank. As indicated, the valve 60 in Fig. 3 is of the line-mounted type which means that the inlet and outlet ports 61 and 62 are connected in the fuel line as by flanged adaptors 86 and 87, which line at its opposite ends communicates with a pressure refueling unit or pump and with the tank.

Other modes of applying the principle of the invention may be employed, change being made as regards the details described, provided the features stated in any of the following claims, or the equivalent of such, be employed.

I therefore particularly point out and distinctly claim as my invention:

1. A valve comprising a body formed with a passage providing an inlet and an outlet for flow of fluid therethrough, and a valve member movable in said body between passage-closing and passage-opening positions, said valve member constituting a movable partition in said body presenting opposite sides respectively of circular area enclosed by a single boundary line and of annular area enclosed by an outside boundary line which is of diameter at least as great as the boundary line of such circular area, such annular area being less than such circular area and each area of said valve member being exposed to the presssure of fluid in said inlet whereby said valve member may be retained in passage-closing position under the influence of substantially equal fluid pressures on the opposite sides thereof and may be moved to passage-opening position upon reduction of fluid pressure acting on such opposite side and under the influence of fluid pressure acting on such annular area.

2. A valve comprising a body formed with a passage providing an inlet and an outlet for flow of fluid therethrough, a fluid pressure actuated valve member movable in said body to open and to close such passage, and a fixed element in said body surrounded by said valve member to provide an annular area on one side of the latter upon which fluid under pressure in the inlet of such passage acts tending to move said valve member to open such passage, said valve member and body defining a chamber in fluid communication with the fluid under pressure thus acting on such annular area, said valve member having an effective circular area on the opposite side enclosed by a single boundary line which is of diameter substantially the same as the outside boundary line of such annular area upon which fluid under pressure in such chamber acts whereby said valve member is held in passage-closing position until such time as the pressure of the fluid in such chamber is decreased with respect to the pressure of the fluid in the inlet of such passage to a value such that the effect of the last-mentioned pressure on said valve member predominates.

3. A valve comprising a body formed with a passage providing an inlet and an outlet for flow of fluid therethrough, a fluid pressure actuated valve member movably supported in said body for movement between passage-opening and passage-closing positions responsive to fluid pressure-area differentials on opposite sides thereof, said valve member, when in passage-closing position, having an annular area on one side upon which fluid under pressure in the inlet of such passage acts tending to move said valve member to passage-opening position, said valve member defining with said body a chamber in fluid communication with the fluid under pressure thus acting on said one side of said valve member and having an effective circular area on the opposite side thereof enclosed by a single boundary line which is of diameter approximately equal to the outside boundary line of such annular area and acted upon by such fluid under pressure in such chamber to thus overbalance the effect of the fluid under pressure acting on such annular area, and said body being formed with an opening leading into such chamber through which fluid under pressure in such chamber is adapted to be released for decreasing the pressure of the fluid in such chamber with respect to that acting on such annular area to a value such that said valve member will be moved to passage-opening position under the influence of the fluid under pressure on such annular area, the difference area of opposite sides of said valve member, within the inside boundary line of such annular area, being exposed to the outlet of such passage.

4. A valve comprising a body formed with a passage providing an inlet and an outlet for flow of fluid therethrough, a valve member supported for movement in said body between passage-opening and passage-closing positions, resilient means urging said valve member to passage-closing position, said valve member constituting a movable partition which has an annular area on one side thereof exposed to fluid under pressure in the inlet of such passage tending to move said valve member to passage-opening position and which defines with said body a chamber to which the opposite side of said valve member is exposed on an effective circular area enclosed by a single boundary line of diameter approximately equal to the diameter of the outside boundary line of such annular area, such chamber being in relatively restricted fluid communication with the fluid under pressure acting on such one side whereby fluid under pressure in such chamber acting on such opposite side, together with the force exerted by said resilient means, tends to hold said valve member in passage-closing position, said body having an opening which leads into such chamber and through which fluid under pressure in such chamber is adapted to be released at a more rapid rate than it can be replenished from such passage whereby said valve member will be moved to passage-opening position under the predominating influence of the then greater fluid pressure acting on such one side thereof over the combined influence of said resilient means and of the reduced fluid pressure in such chamber.

5. A fuel shut-off valve and the like comprising a hollow body, said body being formed with an inlet passage for incoming fuel and with a peripheral outlet passage for flow of fuel therethrough from the inlet passage, a fixed element coaxial with said inlet passage and provided with an opening affording fluid communication between said passages, and a valve member in said body movable between positions opening and closing said inlet passage, said valve member including a first laterally flexible diaphragm having central and peripheral portions secured to said fixed element and to said valve member respectively so as to present an annular area exposed to fuel under pressure in said inlet passage, and a second laterally flexible diaphragm having central and peripheral portions secured to said valve member and to said body respectively so as to define with the latter a chamber in fluid communication with said inlet passage to thus expose a circular area of said second diaphragm and valve member to fuel pressure in such chamber, such circular area being enclosed by a single boundary line of diameter aproximately equal to the outside boundary line of such annular area said body being further formed with an opening leading to such chamber through which fuel under pressure in such chamber is adapted to be released to permit movement of said valve member to inlet passage-opening position under the influence of fuel pressure acting on such annular area, such annular area being less than the other area whereupon the closing of such pressure-releasing opening results in fuel pressure equalization in such chamber and in such inlet passage and consequent movement of said valve member to inlet passage-closing position under influence of the greater force acting on the circular area of said second diaphragm.

6. A line-mounted type fuel shut-off valve and the like comprising a body formed with inlet and outlet passages at its respective ends and with a partition around which fuel is adapted to flow from said inlet passage to said outlet passage, a fixed element coaxial with said inlet passage and provided with an opening affording fluid communication between said passages for flow as aforesaid, and a valve member in said body movable between positions opening and closing said inlet passage, said valve member including a first laterally flexible diaphragm having central and peripheral portions secured to said fixed element and to said valve member respectively so as to present an annular area exposed to fuel under pressure in said inlet passage, and a second laterally flexible diaphragm having central and peripheral portions secured to said valve member and to said partition respectively so as to define with the latter a chamber in fluid communication with said inlet passage to thus expose an area of said second diaphragm and valve member to fuel pressure in such chamber, said body being further formed with an opening leading to such chamber through which fuel under pressure in such chamber is adapted to be released to permit movement of said valve member to inlet passage opening position under the infleunce of fuel pressure acting on such annular area, such annular area being less than the other area whereupon the closing of such pressure-releasing opening results in fuel pressure equalization in such chamber and in such inlet passage and consequent movement of said valve member to inlet passage-closing position under influence of the greater force acting on said second diaphragm.

7. A valve comprising a body formed with inlet and outlet passages for flow of fluid therethrough, a fixed element in said body coaxial with said inlet passage, and a valve member in said body movable between positions opening and closing said inlet passage, said valve member including a first laterally flexible diaphragm having central and peripheral portions secured to said fixed element and to said valve member respectively so as to present an annular area exposed to fluid under pressure in said inlet passage, and a second laterally flexible diaphragm having central and peripheral portions secured to said valve member and to said body respectively so as to define with the latter a chamber in fluid communication with said inlet passage to thus expose a circular area of said second diaphragm and valve member to fluid pressure in such chamber, such circular area being enclosed by a single boundary line of diameter approximately equal to the outside boundary line of such annular area, said body being further formed with an opening leading to such chamber through which fluid under pressure in such chamber is adapted to be released to permit movement of said valve member to inlet passage-opening position under the influence of fluid pressure acting on such annular area, such circular area being greater than such annular area whereupon closing of such pressure-releasing opening results in fluid pressure equalization in such chamber and in such inlet passage and consequent movement of said valve member to inlet passage-closing position under influence of the greater force acting on the circular area of said second diaphragm.

8. The valve of claim 7 wherein the sides of said diaphragms which are opposite to those exposed to fluid under pressure in such inlet passage and in such chamber are exposed to such outlet passage.

9. The valve of claim 7 wherein said fixed element is in the form of a disc supported by legs in such inlet passage.

References Cited in the file of this patent
UNITED STATES PATENTS

| 197,037 | Magnus | Nov. 13, 1877 |
| 715,706 | Tippett | Dec. 6, 1902 |
| 1,741,250 | Protzer | Dec. 31, 1929 |

FOREIGN PATENTS

| 988,327 | France | Apr. 25, 1951 |